United States Patent
Nedelman

(10) Patent No.: US 10,336,165 B2
(45) Date of Patent: Jul. 2, 2019

(54) SPRING-ACTIVATED EXTENDABLE SUN VISOR BLADE

(71) Applicant: FORD GLOBAL TECHNOLOGIES, LLC, Dearborn, MI (US)

(72) Inventor: Marc David Nedelman, Waterford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 404 days.

(21) Appl. No.: 14/701,786

(22) Filed: May 1, 2015

(65) Prior Publication Data

US 2016/0318378 A1 Nov. 3, 2016

(51) Int. Cl.
*B60J 3/02* (2006.01)

(52) U.S. Cl.
CPC .......... *B60J 3/0239* (2013.01); *B60J 3/0265* (2013.01)

(58) Field of Classification Search
CPC . B60J 3/02; B60J 3/0204; B60J 3/0213; B60J 3/0239; B60J 3/0234; B60J 3/0256
See application file for complete search history.

(56) References Cited

U.S. PATENT DOCUMENTS

| | | | |
|---|---|---|---|
| 4,919,468 A | | 4/1990 | Abu-Shumays et al. |
| 5,149,092 A | * | 9/1992 | Parsons ............ F41B 15/027 135/40 |
| 5,409,285 A | * | 4/1995 | Snyder ............ B60J 3/0239 248/279.1 |
| 5,595,386 A | * | 1/1997 | Parsons ............ F41B 15/027 135/40 |
| 5,653,490 A | * | 8/1997 | Fink ............ B60J 3/0239 296/97.11 |
| 5,871,252 A | | 2/1999 | Gute |
| 6,099,066 A | | 8/2000 | Corn |
| 6,213,672 B1 | * | 4/2001 | Varga ............ A47L 13/20 15/144.4 |
| 6,264,263 B1 | | 7/2001 | Hayes et al. |

(Continued)

FOREIGN PATENT DOCUMENTS

| | | | | |
|---|---|---|---|---|
| CA | 2825103 A1 | * | 10/2012 | ............ B60J 3/0239 |
| CN | 102002918 B | | 7/2012 | |

(Continued)

OTHER PUBLICATIONS

English machine translation of KR20140055904.

(Continued)

*Primary Examiner* — Hilary L Gutman
(74) *Attorney, Agent, or Firm* — Vichit Chea; King & Schickli, PLLC

(57) ABSTRACT

A carrier assembly for a vehicle extendable sun visor includes a track element defining a channel, a compression spring disposed within the channel, and a carrier slidably received within the channel, the carrier including a spring plate detent. A first compression spring end may contact a first track element end and a second, opposed compression spring end may contact the carrier. The track element includes a detent aperture for engaging the spring plate detent. The spring plate detent may include a pin for engaging the detent aperture. An arm is slidably received within the carrier and the track element. Extendable sun visor assemblies including the carrier assembly are described.

13 Claims, 5 Drawing Sheets

(56) References Cited

U.S. PATENT DOCUMENTS

| | | | | |
|---|---|---|---|---|
| 7,032,949 B1* | 4/2006 | Wang | ............... | B60J 3/0278 |
| | | | | 296/97.5 |
| 7,373,942 B1* | 5/2008 | Yeager | ............... | A61H 3/00 |
| | | | | 135/67 |
| 7,823,954 B2 | 11/2010 | Jones et al. | | |
| 2004/0145209 A1* | 7/2004 | Peterson | ............ | B60J 3/0208 |
| | | | | 296/97.11 |
| 2004/0180764 A1* | 9/2004 | Patton | ............ | A63B 21/0004 |
| | | | | 482/110 |
| 2007/0236054 A1* | 10/2007 | Bateman | ............ | A47C 3/34 |
| | | | | 297/58 |
| 2013/0234458 A1* | 9/2013 | Wilkins | ............ | A47G 25/902 |
| | | | | 294/3.6 |
| 2015/0140890 A1* | 5/2015 | Perlmutter | ............ | A63H 33/36 |
| | | | | 446/22 |

FOREIGN PATENT DOCUMENTS

| | | | | | |
|---|---|---|---|---|---|
| DE | 3235997 | A1 * | 3/1984 | ............ | B60J 3/0239 |
| DE | 3842705 | A1 | 6/1990 | | |
| DE | 202007016327 | U1 | 2/2008 | | |
| JP | 2011230560 | A * | 11/2011 | ............ | B60J 3/0239 |
| JP | 2013248922 | A * | 12/2013 | ............ | B60J 3/0265 |
| JP | WO 2015071930 | A1 * | 5/2015 | ............ | F16F 1/16 |
| KR | 1020140055904 | A | 5/2014 | | |
| WO | WO 2010045438 | A1 * | 4/2010 | ............ | B60J 3/0239 |

OTHER PUBLICATIONS

English machine translation of DE3842705.
English machine translation of DE2007016327.
English machine translation of CN102002918.

\* cited by examiner

SPRING-ACTIVATED EXTENDABLE SUN VISOR BLADE

TECHNICAL FIELD

This disclosure relates generally to sun visors for motor vehicles. More particularly, the disclosure relates to an improved extendable sun visor blade including a telescoping extension mechanism and a convenient release mechanism.

BACKGROUND

It is known to provide extendable sun visors for vehicles, with the intended purpose of allowing greater flexibility for the user in positioning the sun visor to prevent or reduce glare. Prior art designs often are simply a visor panel or blade which the user can manually slide along a support arm, or from within a main visor body panel, to translate the panel from a first position to a second position.

With reference to FIG. 1, it is also known to provide an extendable sun visor assembly 10 including a visor panel 12 and a support arm 14. Visor panel 12 is configured for rotation about an axis defined by support arm 14, allowing the panel to be translated between a raised position (in a substantially coplanar orientation with a vehicle passenger compartment roof) and a lowered position to block sun glare. A bracket 16 may be included for securing the assembly 10 to a vehicle (not shown). Bracket 16 may include an articulated portion 18 allowing the arm 14 to be rotated outwardly and/or downwardly to adjust the visor panel 12 to a preferred position. Visor panel 12 may also include a retainer 20 which is engaged by a cooperating receiver (not shown) disposed in the vehicle (typically on or near the passenger compartment roof) to hold the panel 12 in place.

A translating mechanism 22 may be provided including a channel or track defined within the visor panel 12 and further including a compression spring 24 for biasing the panel 12 from a stowed configuration to a deployed configuration. In turn, a carrier 26 may be included, slidably received within the channel or track and within which arm 14 is slidably received, for translating the visor panel 12 between the stowed configuration and the deployed configuration. A catch 28 may be provided to retain the visor panel 12 in one or both of the stowed configuration and the open configuration.

While effective for their intended purposes, the above-described prior art extendable sun visors suffer from various deficiencies. Specifically, manually extendable sun visor designs may not be apparent to the user, i.e. the vehicle owner may not be aware that the sun visor is extendable, and there is nothing on the sun visor that indicates such extendibility. Moreover, conventional extendable sun visor designs can require significant effort to operate, and may not extend sufficiently far out to block sun glare for all users. Thus, a need is identified in the art for improvements to extendable sun visor designs.

SUMMARY

In accordance with the purposes and benefits described herein and to solve the above-summarized and other problems, in one aspect a carrier assembly for a vehicle extendable sun visor is provided including a track element defining a channel, a compression spring disposed within the channel, and a carrier slidably received within the channel. The carrier includes a spring plate detent for retaining the extendable sun visor in a stowed configuration, and for releasing the extendable sun visor to a deployed configuration. The track element includes a detent aperture for engaging the spring plate detent. In embodiments, the spring plate detent includes a pin for engaging the detent aperture. A supporting arm is slidably received within the carrier and the track element. A first compression spring end contacts a first track element end and a second, opposed compression spring end contacts the carrier.

In other aspects of the disclosure, extendable sun visor extension assemblies and extendable sun visor assemblies are provided including the carrier assembly described above.

In the following description, there are shown and described embodiments of the disclosed extendable sun visor assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed extendable sun visor assembly, and together with the description serve to explain certain principles thereof. In the drawing.

Reference will now be made in detail to embodiments of the disclosed extendable sun visor assembly, examples of which are illustrated in the accompanying drawing figures wherein like reference numerals indicate like features.

DETAILED DESCRIPTION

Figure 1:
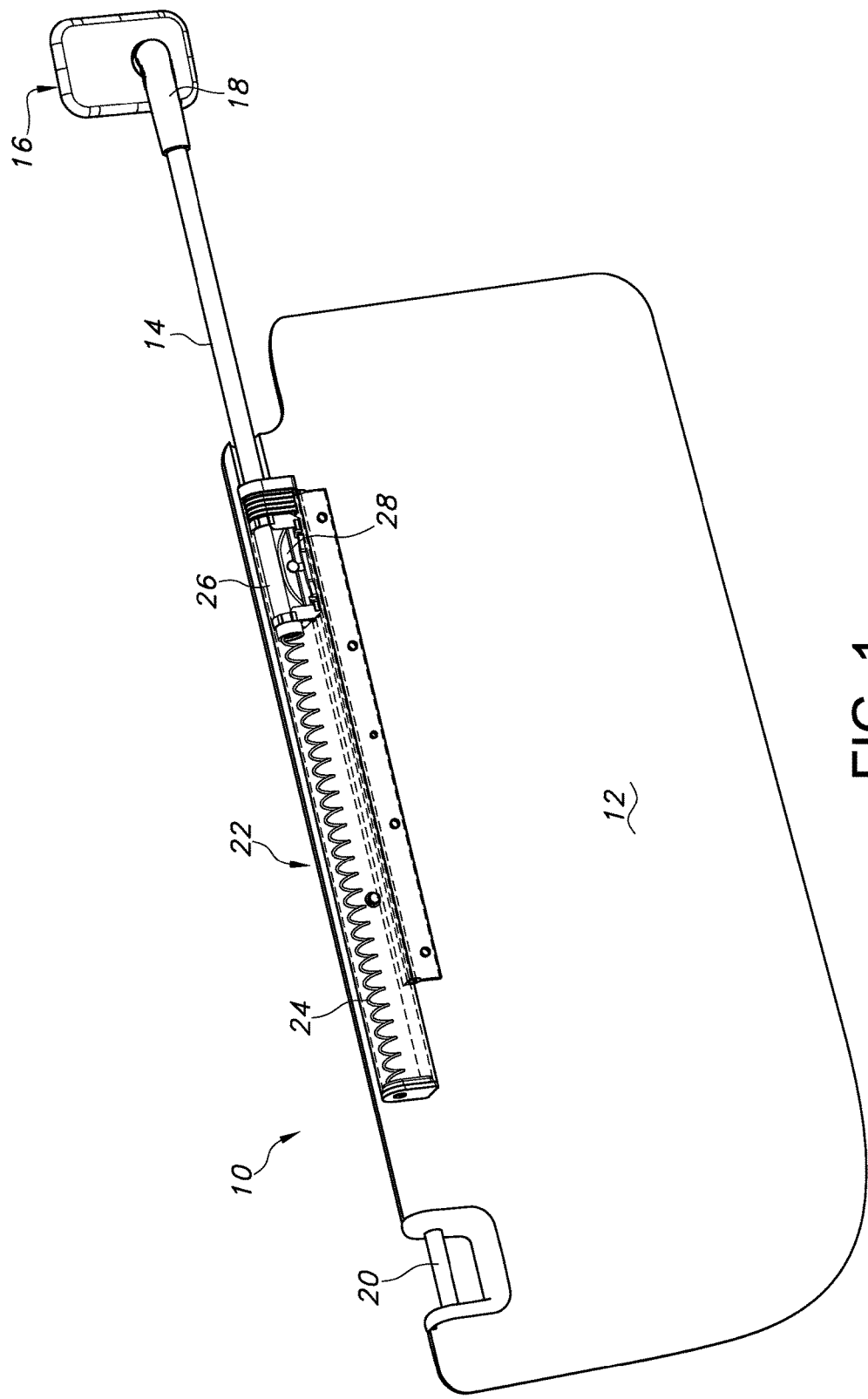
FIG. 1 depicts a prior art extendable sun visor.
Figure 2:
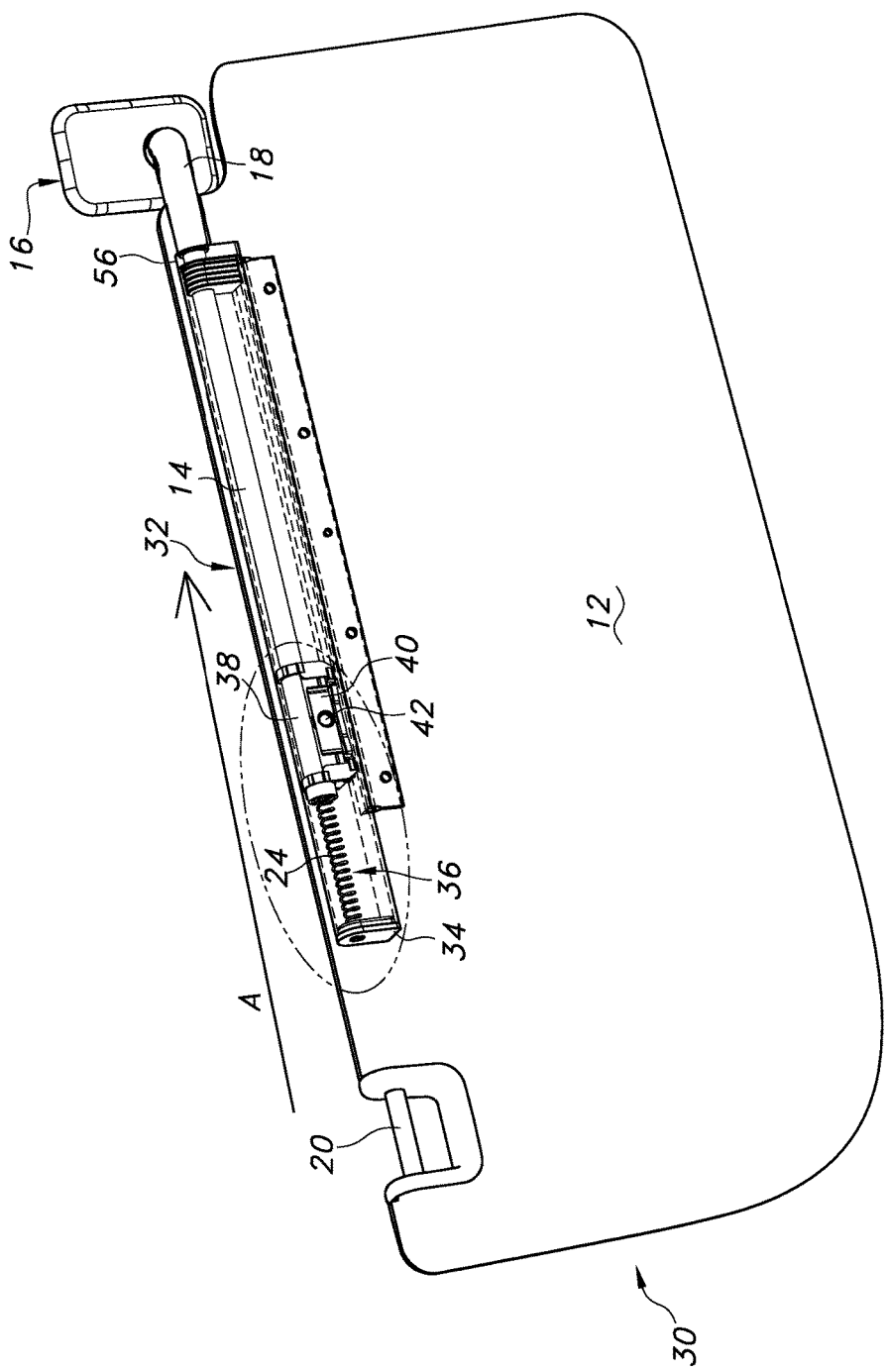
FIG. 2 depicts an extendable sun visor according to the present disclosure, held in a stowed configuration.

With reference to FIG. 2 an extendable sun visor assembly 30 is provided including a sun visor panel 12, an arm 14, and a vehicle mounting bracket 16. In the embodiment depicted in the drawing figure, the sun visor assembly 30 is shown in a stowed configuration. A carrier assembly 32 is provided for translating the sun visor panel 12 between a stowed configuration and a deployed configuration.

Figure 3:
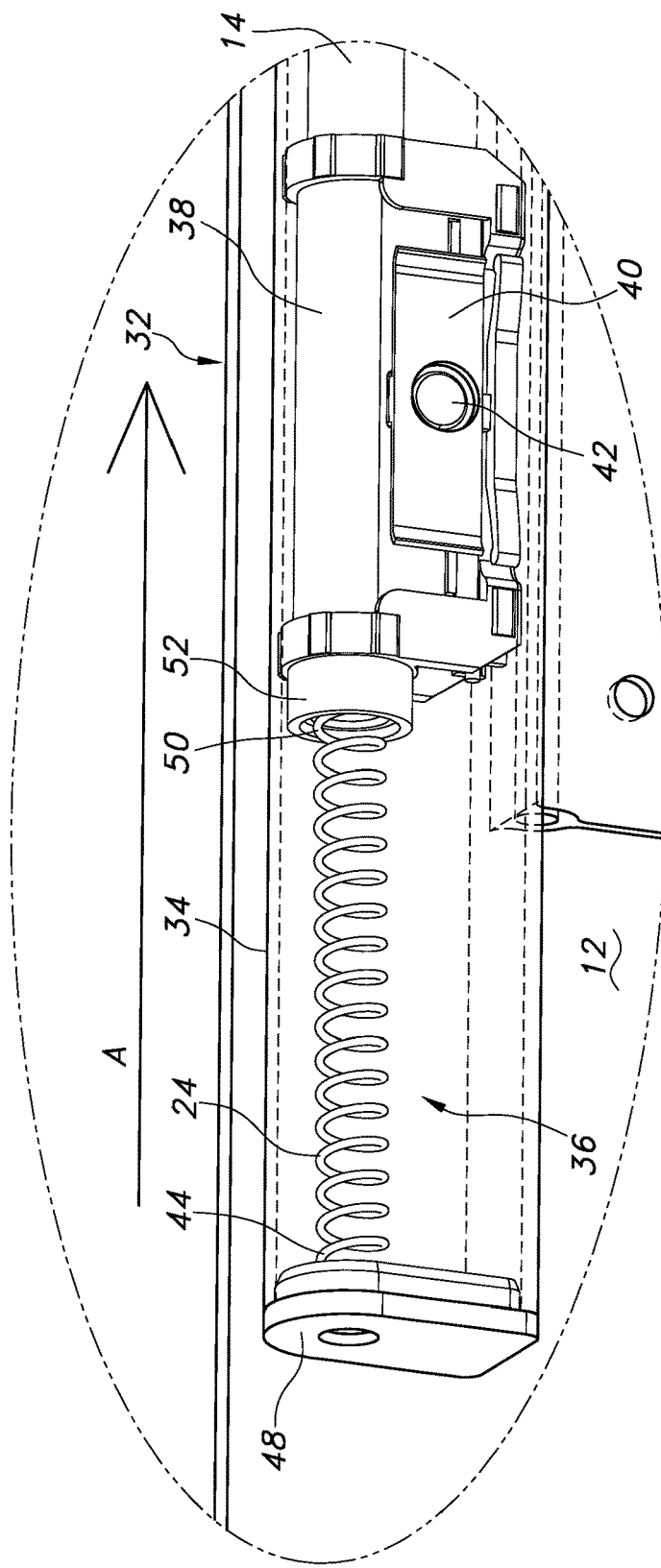
FIG. 3 depicts an isolated view of a translating or extension mechanism for the extendable sun visor of FIG. 2.

Turning now to FIG. 3, the carrier assembly 32 includes a track element 34 disposed within sun visor panel 12 (see FIG. 2) and defining a channel 36. A carrier 38 is slidably received within channel 36. In turn, arm 14 is slidably received within carrier 38. Carrier 38 further includes a spring plate detent 40 which may include a detent pin 42. A compression spring 24 is disposed whereby a first compression spring end 44 contacts an end cap 48 of track element 34 and a second compression spring end 50 contacts the carrier 38. A receiver 52 may be provided on carrier 38, configured to receive second compression spring end 50 therein.

Figure 4:
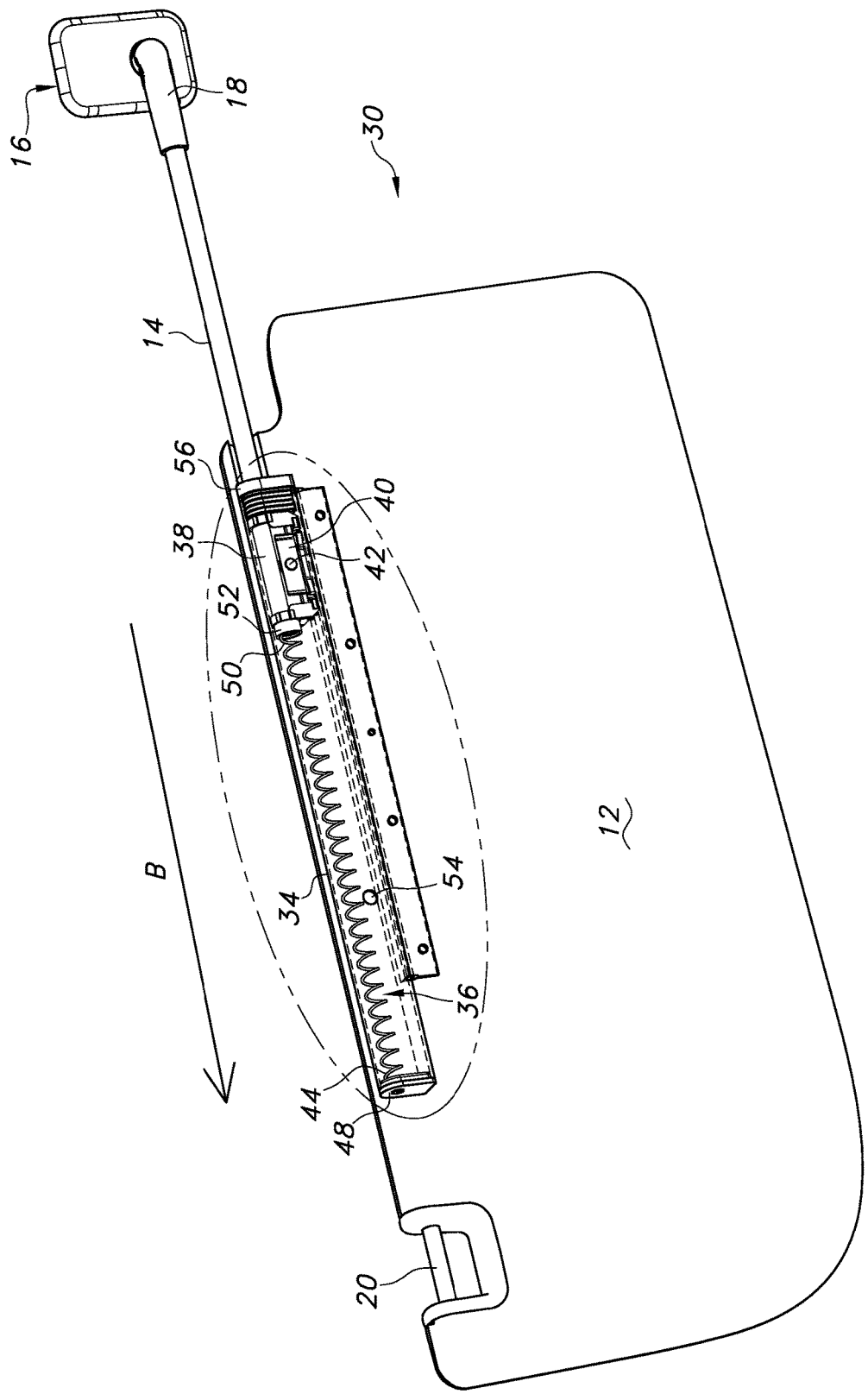
FIG. 4 depicts an extendable sun visor according to the present disclosure, held in a deployed configuration.

Track element 34 further includes a detent aperture 54 (best seen in FIGS. 4 and 5) in a wall thereof, which engages spring plate detent 40 (in the depicted embodiment, via detent pin 42) when the carrier assembly 32 is placed in the stowed configuration shown in FIG. 2. A second end cap 56 is provided at an opposed end of track element 34, for stopping sliding movement of the carrier 38 as will be described below.

In use, referring back to FIG. 2 the extendable sun visor assembly 30 is placed in a stowed configuration by biasing in a first direction (see arrow A) to cause the sun visor assembly 30 to telescope inwardly over arm 14 until spring plate detent 40 engages detent aperture 54. In that configuration, compression spring 24 is compressed and the sun visor assembly 30 is retained in the stowed configuration. Then, the sun visor panel 12 can be rotated upwardly to a raised configuration in a substantially coplanar orientation with the vehicle passenger compartment roof as is known.

Figure 5:
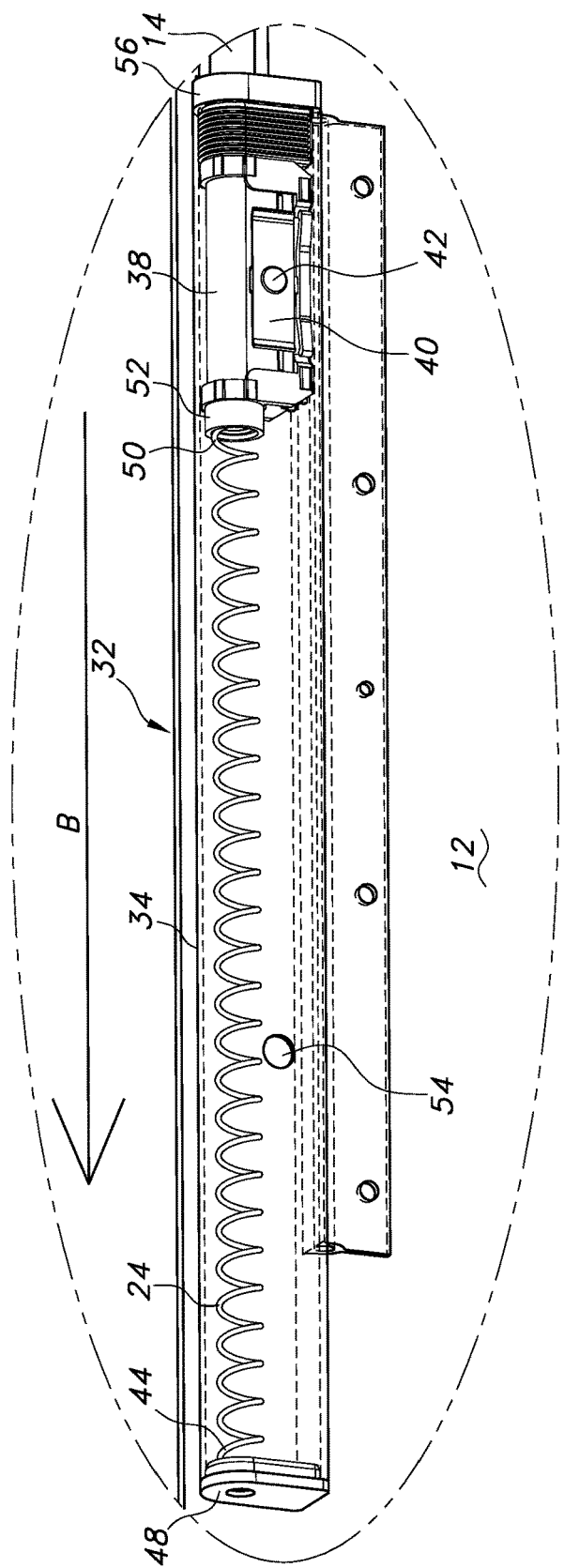
FIG. 5 depicts an isolated view of a translating or extension mechanism for the extendable sun visor of FIG. 4.

To deploy the sun visor assembly 30, a user rotates the sun visor panel 12 downwardly, away from the passenger compartment roof. As will be appreciated, in this orientation the spring plate detent 40 is now clearly visible to the user from her position in the vehicle seat. The user now need only press on spring plate detent 40 to disengage detent pin 42 from detent aperture 54. When detent pin 42 fully disengages from detent aperture 54, the energy stored by compression spring 24 is released, and compression spring 24 automatically biases carrier assembly 32 and sun visor panel 12 attached thereto in a second, opposed direction (see arrow B), telescoping outwardly over arm 14 to the deployed configuration shown in FIG. 4. As best seen in FIG. 5, end cap 56 stops the path of travel of carrier 38 within track element 32, and thereby stops the sliding movement of sun visor assembly 30.

As will be appreciated, by the foregoing described features a simple, robust, and easy-to-operate extendable sun visor assembly 30 is provided. The release mechanism (spring plate detent 40) is easy to locate and operate, further contributing to the convenience of the device. In turn, translation of the extendable sun visor assembly 30 from the stowed configuration to the deployed configuration is substantially automatic, requiring limited attention from a vehicle driver or passenger.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A carrier assembly for translating a vehicle extendable sun visor between a stowed configuration and a deployed configuration, comprising:

a track element defining a channel;
   a compression spring disposed within the channel; and
   a carrier slidably received within the channel, the carrier including a spring plate detent, wherein the track element includes a detent aperture configured to releasably engage the spring plate detent to retain the vehicle extendable sun visor in the stowed configuration and to disengage the spring plate detent such that the compression spring is released to automatically bias the vehicle extendable sun visor into the deployed configuration.

2. The assembly of claim 1, wherein the spring plate detent includes a pin for engaging the detent aperture.

3. The assembly of claim 1, further including an arm slidably received within the carrier and the track element.

4. The assembly of claim 1, wherein the track element is disposed within a sun visor panel.

5. The assembly of claim 3, wherein a first compression spring end contacts a first track element end and a second, opposed compression spring end contacts the carrier.

6. The assembly of claim 1, further including an end cap disposed at a second track element end for stopping a sliding movement of the carrier.

7. A vehicle including the carrier assembly of claim 1.

8. A sun visor extension assembly for a vehicle, comprising:

a track element defining a channel including a detent aperture;
   a compression spring disposed within the channel; and
   a carrier slidably received within the track element, the carrier including a spring plate detent having a pin for engaging the detent aperture and biasing the sun visor extension assembly in a first direction,
   whereby the pin is configured to fully disengage from the detent aperture to release the compression spring and automatically bias the sun visor extension assembly in a second, opposite direction.

9. The assembly of claim 8, further including an arm slidably received within the carrier and the track element.

10. The assembly of claim 8, wherein the track element is disposed within a sun visor panel.

11. The assembly of claim 9, wherein a first compression spring end contacts a first track element end and a second, opposed compression spring end contacts the carrier.

12. The assembly of claim 8, further including an end cap disposed at a second track element end for stopping a sliding movement of the carrier.

13. A vehicle including the assembly of claim 8.

* * * * *